(No Model.)

G. A. GRANT.
GATE.

No. 337,148. Patented Mar. 2, 1886.

WITNESSES:

INVENTOR:
G. A. Grant
BY Munn &Co.
ATTORNEYS.

UNITED STATES PATENT OFFICE.

GEORGE A. GRANT, OF EDDYVILLE, IOWA.

GATE.

SPECIFICATION forming part of Letters Patent No. 337,148, dated March 2, 1886.

Application filed August 14, 1885. Serial No. 174,403. (No model.)

*To all whom it may concern:*

Be it known that I, GEORGE A. GRANT, of Eddyville, in the county of Wapello and State of Iowa, have invented certain new and useful Improvements in Gates, of which the following is a full, clear, and exact description.

This invention relates to a gate composed of a number of wires hinged at one end to a fixed post and their opposite ends secured to a movable upright, and to the construction, arrangement, and operation of a wire gate, substantially as described.

Reference is to be had to the accompanying drawings, forming part of this specification, in which similar letters of reference indicate corresponding parts in all the figures.

Figure 1:
Figure 2:
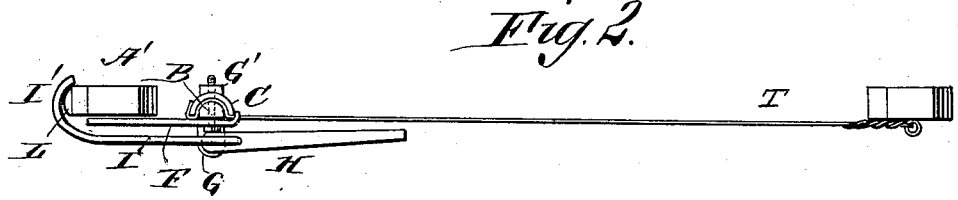
Figure 3:
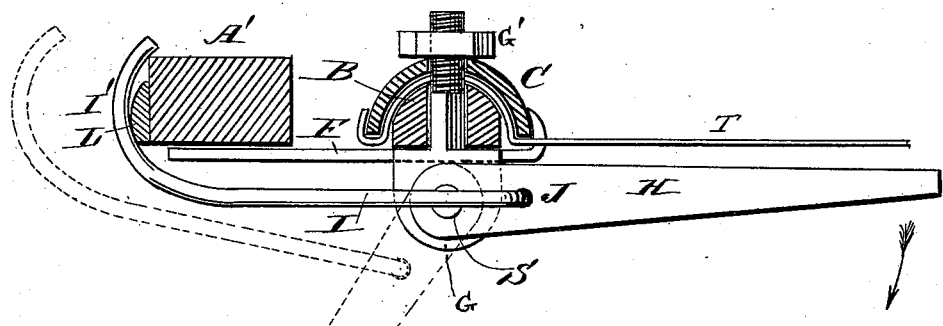
Figure 4:

Figure 1 represents a side elevation of my improved gate complete and closed; Fig. 2, a plan or top view of Fig. 1; Fig. 3, a section on line $x\ x$ of Fig. 1; Fig. 4, a detached view of stud G.

A A' in the accompanying drawings represent two fixed posts set in the ground at the distance apart that the length of the gate is to be. A movable upright is provided, to which the wires T are secured at one end. It consists of an upright, B, flat on one side and convex on the opposite side, and a corresponding concave semicircular shell, C, fitted to the convex side of the upright B, as shown in Figs. 2 and 3. These convex and concave uprights B C are secured together by bolts and nuts D E at the top and bottom, which bolts and nuts also serve to secure two arms, F F, thereto to maintain the gate in an upright position when closed, as shown in Figs. 1, 2, and 3.

To the flat face of the upright B, at a proper distance from the ground, is secured a stud, G, to which is pivoted a tightening-lever, H. To this tightening-lever H, on the pivoted end at J, is hooked a link, I, its opposite end, I', being hooked around the outer edge of the fixed post A', as shown in Figs. 2 and 3.

To the upper and lower ends of the upright B are bolted two arms, F F, which serve to maintain the gate in an upright position when closed, and serve as guides in turning the tightening-lever H to draw the wires T straight and taut, and to draw the hooked end I' of the link snugly against the outer edge of the post in closing the gate.

L is a guard-block secured to the outer edge of the fixed post A' to take the wear of the hook I' to preserve the post from injury, and said block may be removed to be replaced by a new one when required.

The several parts composing the gate having been prepared, the ends O of the wires T are formed into loops, and are secured to the fixed post A by staples P, which serve as pivots in opening and closing the gate. The opposite ends of the wires are then passed between the convex side of the upright B and the concave shell C and firmly clamped between them by means of the bolts and nuts D E G', as shown in Figs. 1, 2, and 3. By this construction and arrangement there is but one upright to the gate, the opposite ends of the wires being pivoted directly to the fixed post A.

To open the gate, the tightening-lever H is turned on its pivot S to the position shown in dotted lines, Fig. 3, which releases the hook I' of the link from the post A' and permits the upright B to be moved to open the gate to the width desired.

To close the gate, the upright B is returned to the face of the post A', the hooked end I' of the link I is passed over the edge of the post A' and in front of the guard-block L, the arms F brought against the side of the fixed post A', and the lever H turned from the position shown in dotted lines, so as to rest parallel with the wires to draw them straight and taut, as shown in Figs. 1 and 2. The guard-block L serves also to gage the tension of the wires T to draw them tighter or looser, as required, by making the block thicker or thinner, as the case may be; and when the wires are not of the required length the block may be made to compensate for the difference, so that when the gate is closed the wires will be straight and taut, as represented.

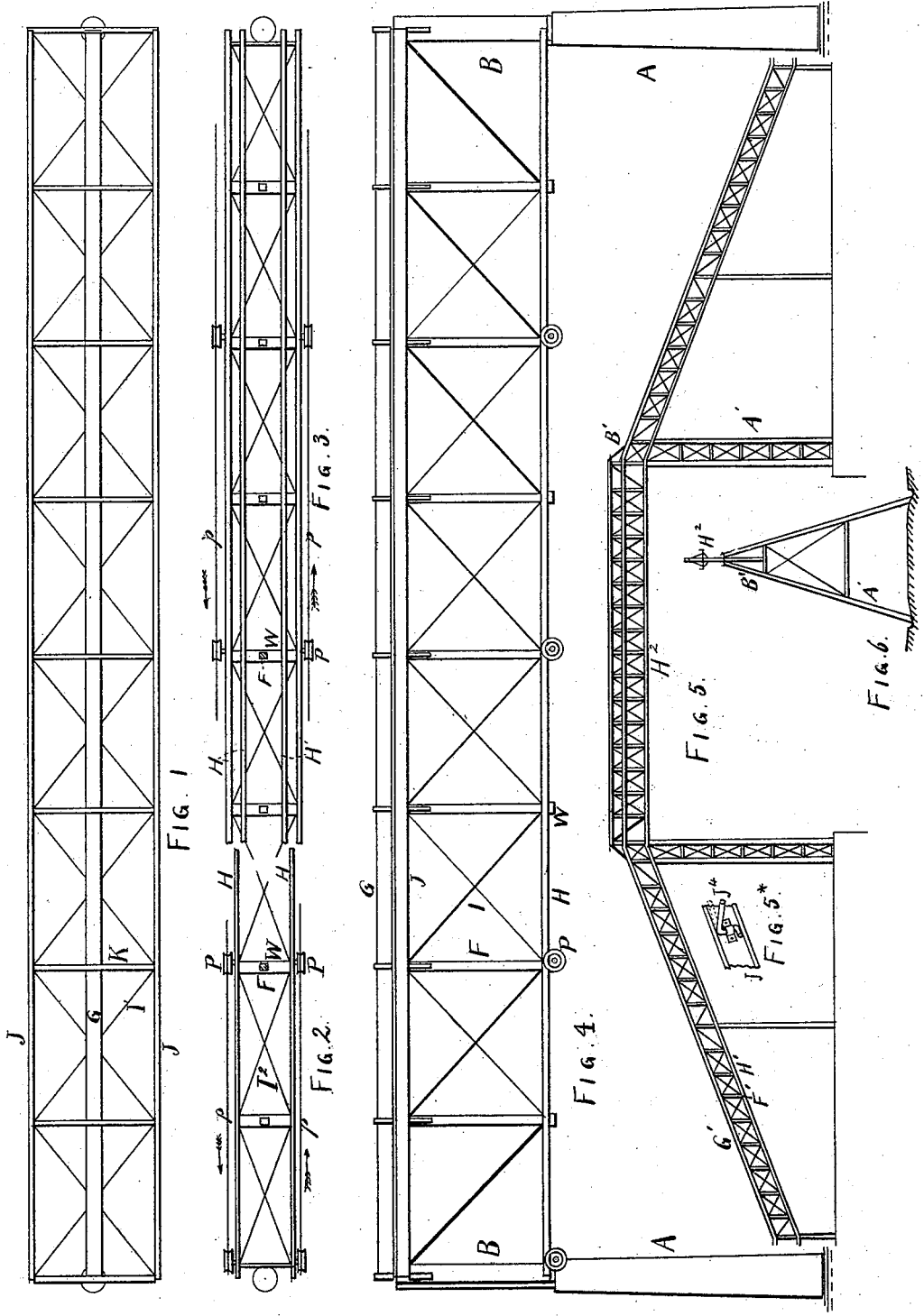

Having thus described my invention, I claim as new and desire to secure by Letters Patent—

1. A gate consisting of the fixed posts A A', wires T, convex and concave uprights B C, hooked link I, and tightening-lever H, the parts being combined substantially as described.